United States Patent [19]

Sawada et al.

[11] Patent Number: 4,970,994
[45] Date of Patent: Nov. 20, 1990

[54] INTAKE MANIFOLD FOR V-TYPE INTERNAL COMBUSTION ENGINE

[75] Inventors: Takashi Sawada, Tokyo; Eiichi Fujisawa, Yokohama; Hiroshi Hashimoto, Chigasaki, all of Japan

[73] Assignee: Nissan Motor Co., Ltd., Yokohama, Japan

[21] Appl. No.: 480,458

[22] Filed: Feb. 15, 1990

[30] Foreign Application Priority Data

Feb. 17, 1989 [JP] Japan ..................... 1-37799

[51] Int. Cl.⁵ .............................. F02M 35/00
[52] U.S. Cl. .................................. 123/52 MV
[58] Field of Search ......... 123/52 M, 52 MB, 52 MC, 123/52 MV, 52 MF

[56] References Cited

U.S. PATENT DOCUMENTS

| | | | |
|---|---|---|---|
| 4,708,097 | 11/1987 | Hatamura et al. | 123/52 MV |
| 4,763,612 | 8/1988 | Iwanami | 123/52 MV |
| 4,821,684 | 4/1989 | Tasaka | 123/52 MV |
| 4,829,942 | 5/1989 | Ampferer | 123/52 MV |
| 4,901,681 | 2/1990 | Pozniak et al. | 123/52 MV |

FOREIGN PATENT DOCUMENTS 62-153516 7/1987 Japan .

*Primary Examiner*—David A. Okonsky
*Attorney, Agent, or Firm*—Pennie & Edmonds

[57] ABSTRACT

An intake manifold for a V-type multi-cylinder internal combustion engine provided with two banks each including a cylinder head. The intake manifold comprises lower and upper intake air collectors which lie one upon another and located above one of the two banks. The intake air collectors are supplied with intake air from an air filter. A first group of branch runners are provided to connect the lower intake air collector with the cylinder head of one bank, while a second group of branch runners are provided to connect the upper intake air collector with the cylinder head of the other bank. The upper end section (connected to the lower intake air collector) of each of the first group of branch runners and the upper end section (connected to the upper intake air collector) of each of the second group of branch runners lie one upon another thereby to form a space required for an ignition device and installation operation therefor, between the adjacent branch runners in the cylinder head logitudinal direction.

12 Claims, 5 Drawing Sheets

INTAKE MANIFOLD FOR V-TYPE INTERNAL COMBUSTION ENGINE

BACKGROUND OF THE INVENTION

1. Field of the Invention

This invention relates to improvements in an intake manifold in a V type multi-cylinder internal combustion engine, and more particularly to a branch runner arrangement in the intake manifold to improve productivity and maintenance effeciency of the engine.

2. Description of the Prior Art

In a V-type engine in which right and left side banks are arranged V-shaped in cross-section, usually an intake manifold is provided between the both banks while an exhaust manifold is provided outside of the banks as disclosed for example in Japanese Patent Provisional Publication No. 62-153516, which is illustrated in FIG. 6 of the drawings of this application.

In FIG. 6, an internal combustion engine includes right and light side banks 72, 73 having engine cylinders and arranged V-shaped in cross-section. The intake system of this engine includes a surge tank 74. The surge tank 74 is communicated through independent branch runners 75, 76 with the engine cylinders. The surge tank 74 is disposed above the left side bank 72 and is formed therein with two expansion chambers 77, 78 which are located one upon another. The lower expansion chamber 78 is connected with the right side bank 73 through the branch runners 75, while the upper expansion chamber 77 is connected with the left side bank 72 through the branch runners 76, thus making the intake manifold arrangement compact.

In the above intake manifold arrangement, the connecting end sections of the respective branch runners 76 to the upper expansion chamber 77 and the connecting end sections of the respective branch runners 75 to the lower expansion chamber 78 are located shifted to each other on an imaginary horizontal plane, corresponding to the locational relationship of the respective engine cylinders. Accordingly, the upper side of the left side bank 72 is unavoidably extensively covered with the respective branch runners 75, 76. This makes difficult the installation operation of ignition devices at the left side bank 72, thereby degrading productivity and maintenance effeciency of the engine.

SUMMARY OF THE INVENTION

It is an object of the present invention to provide an improved intake manifold for a V-type engine, by which productivity and maintenance efficiency of the engine is largely improved, rendering the engine compact while suppressing the overall height of the engine lower.

Another object of the present invention is to provide an improved intake manifold for a V-type engine, providing sufficient spaces required for installation of ignition devices while facilitating installation operation of ignition coils and/or spark plugs.

A further object of the present invention is to provide an improved intake manifold for a V-type engine, in which the overall length of the intake manifold in the cylinder head longitudinal direction is suppressed shorter.

An intake manifold of the present invention is for a V-type multi-cylinder internal combustion engine including two banks each having a cylinder head. The intake manifold is comprised of first and second intake air collectors which are disposed above one of the two banks. Each intake air collector is formed thereinside with an intake air chamber to be supplied with intake air. A first group of branch runners of the intake manifold are for fluidly connecting the first intake air collector with the cylinder head of one of the two banks, in which each branch runner has a first end section directly connected to the first intake air collector and a second end section connected to the cylinder head. A second group of branch runners of the intake manifold are for fluidly connecting the second intake air collector with the cylinder head of the other of the two banks, in which each branch runner has a first end section directly connected to the second intake air collector and a second end section connected to the cylinder head. The first end section of each of the first group of branch runners and the first end section of each of the second group of branch runners are generally vertically aligned so as to form a clearance between the adjacent branch runners in longitudinal direction of the cylinder head.

By virtue of the fact that the intake air collectors are disposed above one bank, the overall height of the engine is suppressed lower while ensuring a sufficient length of each intake manifold branch runner thereby to raise the charging efficiency of the engine. By virtue of the fact that the connection (first) end sections of the respective first and second group branch runners are lie one upon another, a sufficient space for installation of an ignition device is formed between the adjacent branch runners in the longitudinal direction of the cylinder. This makes possible to employ a direct ignition system in which an ignition coil is disposed on a rocker or cam cover. Furthermore, the length of the intake manifold in the cylinder head longitudinal direction is suppressed shorter thereby rendering the engine compact. Moreover, installation operation of the ignition coil and a spark plug can be facilitated, thereby largely improving productivity and maintenance efficiency of the engine.

BRIEF DESCRIPTION OF THE INVENTION

In the drawings, the same reference numerals designate the same elements and parts throughout all figures, in which.

DETAILED DESCRIPTION OF THE INVENTION

Figure 1:
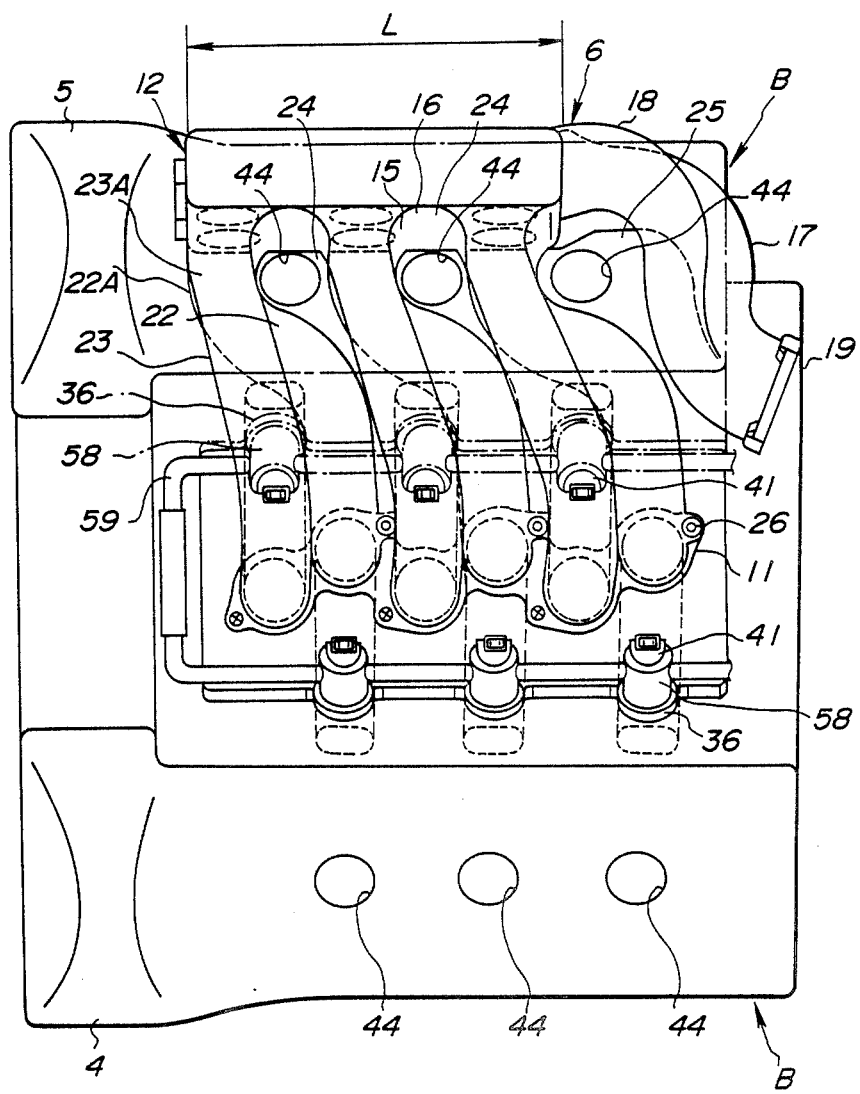
FIG. 1 is a plan view of a V-type engine equipped with an intake manifold according to the present invention.

Referring now to FIG. 1 to 5 of the drawings, a preferred embodiment of an intake manifold according to the present invention is illustrated by the reference numeral 6. In this embodiment, the intake manifold 6 is for a V-type six-cylinder internal combustion engine which has left and right side banks B, B which are arranged V-shaped in cross-section as seen from FIG. 2. The left side bank B includes a left side cylinder head 2 which is fixedly mounted on a cylinder block 1. A left side cam cover 4 is securely disposed on the cylinder head 2. The right side bank B includes a right side cylinder head 3 fixedly mounted on the cylinder block 1. A right side cam cover 5 is securely disposed on the cylinder head 3.

The intake manifold 6 includes a lower block 11 which is disposed in a space defined between the left and right side banks B, B. The lower block 11 includes three lower branch runners 31 and three lower branch runners 32. The three lower branch runners 31 are connected at their lower end sections with the cylinder head 2, while the three lower branch runners 32 are connected at their lower end sections with the cylinder head 3. The upper block 12 of the intake manifold 6 includes three upper branch runners 22 and three upper branch runners 23. The three upper branch runners 22 are connected at their upper end sections with a lower intake air collector 15, while the three upper branch runners 23 are connected at their upper end sections 15, 16 with an upper intake air collector 16. Each intake air collector 15, 16 defines thereinside an intake air chamber (not identified) which is supplied with intake air to be finally sucked into engine cylinders (not shown) in the cylinder block 1. The intake air chamber of the intake air collector 15, 16 is in communication with the respective upper branch runners 22 or 23.

The lower branch runners 31, 32 are respectively integrally formed at their upper end sections with flanges which are integral with each other to form a common flange 37. The upper branch runners 22, 23 are respectively integrally formed at their lower end sections with flanges which are integral with each other to form a common flange 21. The common flanges 37 and 21 are fastened with each other with bolts 26 which pass through bosses 38 in the flange 37 and bosses 39 in the flange 21. Thus, each lower branch runner 31, 32 is fixedly connected with the corresponding upper branch runner 22, 23 thereby to form an intake manifold branch runner (no numeral) which extends through the flanges 21, 37 and is formed thereinside with an intake air passage 13, 14 through which intake air flows. It will be understood that the lower intake air collector 15 is communicated with the intake ports (not shown) of the left side cylinder head 2 through the intake air passages 13, while the upper intake air collector 16 is communicated with the intake ports (not shown) of the right side cylinder head 3.

Figure 3:
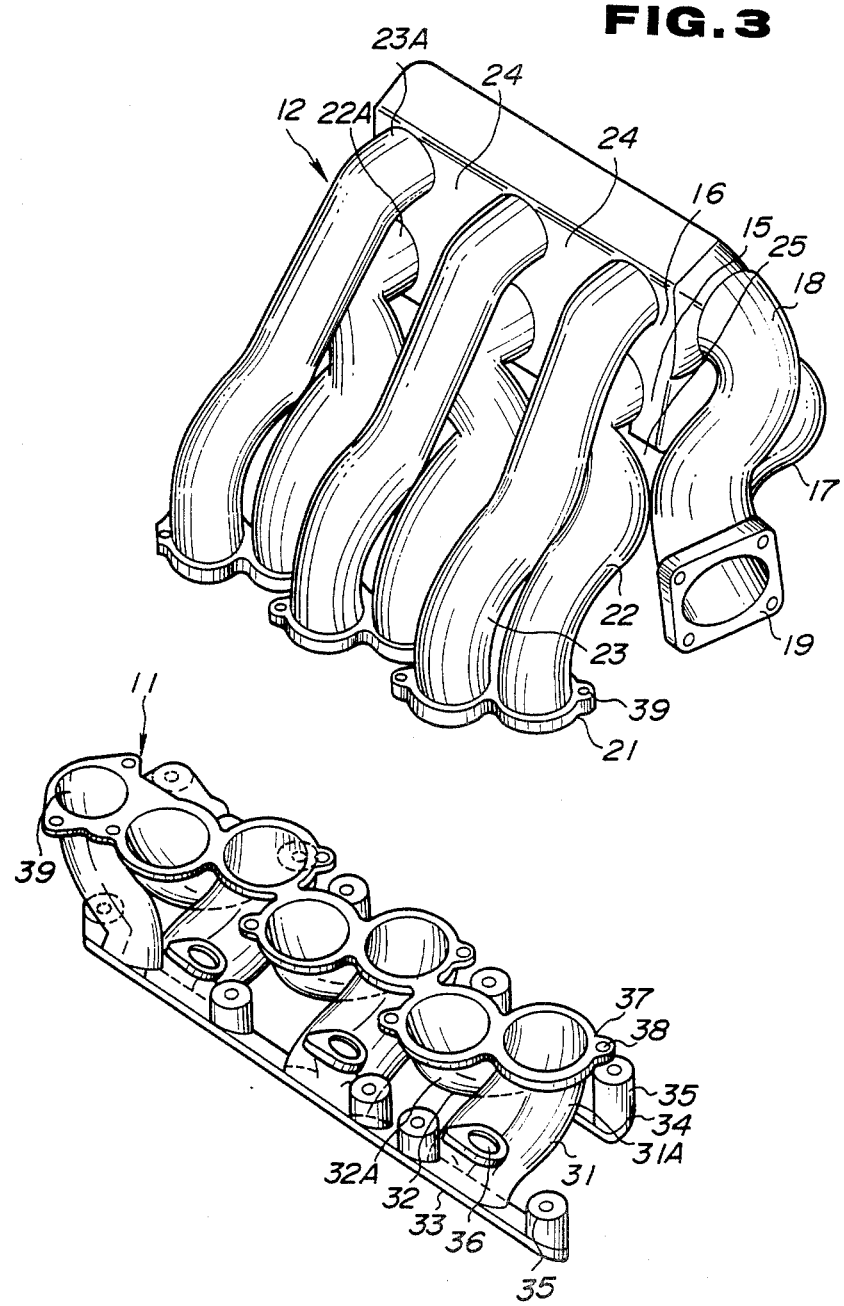
FIG. 3 is an exploded perspective view of the intake manifold of FIG. 1.

As shown in FIG. 3, the lower branch runners 31 are formed at their lower end sections with a common flange 33, while the lower branch runners 32 are formed at their lower end sections with a common flange 34. The common flange 33 is fastened to the cylinder head 2 with bolts (not shown) passing through bosses 35 in the flange 33. The common flange 34 is fastened to the cylinder head 3 with bolts (not shown) passing through bosses 35 in the flange 34. The lower block 11 is formed at the front end section with a pipe section 39 forming part of an engine coolant passage.

The upper block 12 of the intake manifold 6 includes the lower and upper intake air collectors 15, 16 to which the upper branch runners 22 and the upper branch runners 23 are respectively connected. The intake air collectors 15, 16 are disposed above the right side cam cover 5. The lower intake air collector 15 is located immediately above the right side bank B, and the upper intake air collector 16 is located on the lower intake air collector 16. The lower and upper intake air collectors 15, 16 are formed integral with each other and communicable through a variable intake air passage 20 provided with a valve which is controllably openable in accordance with engine operating conditions, so that communication between the both intake air collectors 15, 16 are controllably established through the valve in accordance with the engine operating conditions.

Each of the upper branch runners 22 connected to the lower intake air collector 15 is curved generally S-shaped with curved portions having larger curvatures as projected on an imaginary horizontal plane or in FIG. 1, while each of the upper branch runners 23 connected to the upper intake air collector 16 are curved generally S-shaped with curved portions having smaller curvatures as projected on the imaginary horizontal plane or in FIG. 1. Additionally, the upper end section 23A of each upper branch runner 23 and the upper end section 22A of each upper branch runner 22 are located generally vertically aligned with each other, i.e., lie one upon another as seen from FIGS. 1, 2 and 5. In other words, the upper end sections 22A, 23A of the upper branch runners 22, 23 are located at the generally same position as projected on the imaginary horizontal plane. Such an arrangement of the upper end sections 22A, 23A of the upper manifold runners 22, 23 provides a clearance 24 between the adjacent upper branch runners 22, 22 and between the adjacent upper branch runners 23, 23. An ignition device 50 as shown in FIGS. 4 and 5 is disposed in the clearance 24.

The intake air collectors 15, 16 are integrally formed at their rear end sections with ducts 17, 18 which are combined into one duct and connected to a throttle chamber (not shown) through a connecting flange 19. These ducts 17, 18 are curved generally S-shaped thereby to provide a clearance 25 between them and the rear-most upper branch runners 22, 23. The ignition device 50 is disposed as shown in FIG. 5 is disposed in the clearance 25.

Figure 4:
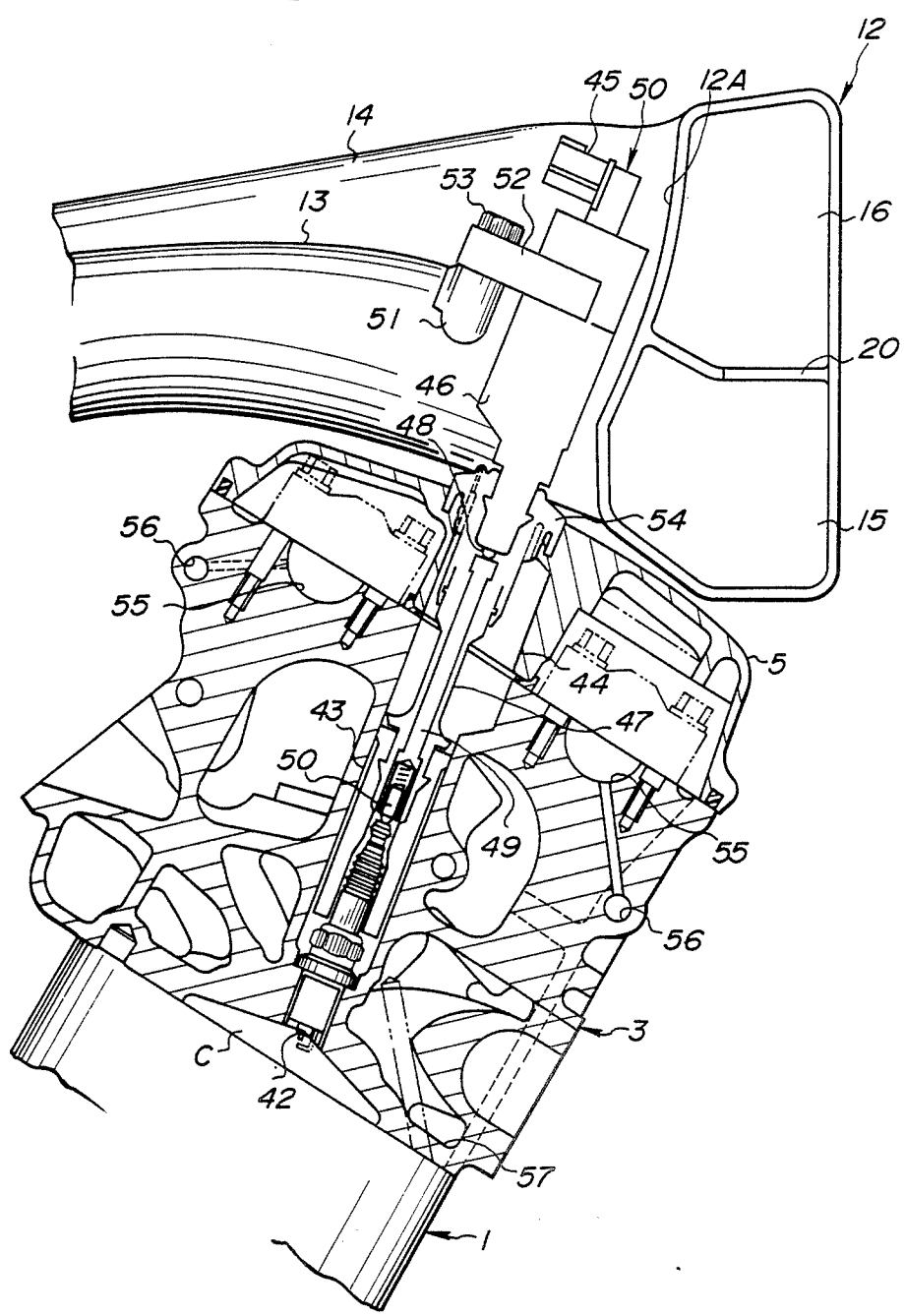
FIG. 4 is a fragmentary sectional view of an essential part of the engine of FIG. 1.
Figure 5:
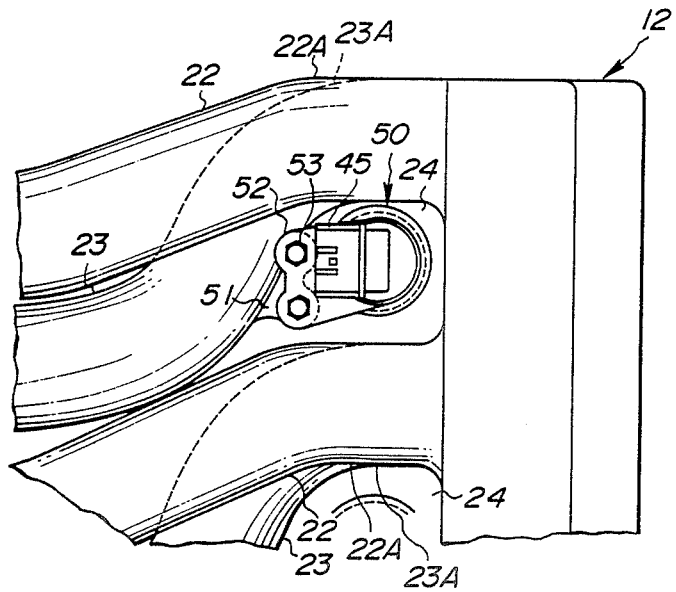
FIG. 5 is a fragmentary plan view of the part of FIG. 4.
Figure 6:
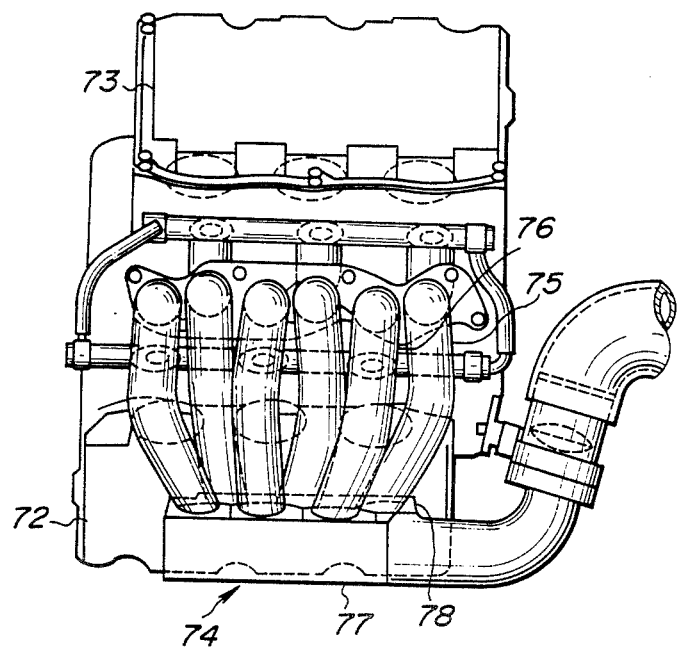
FIG. 6 is a plan view of a V-type engine equipped with a conventional intake manifold.

As shown in FIG. 4, axially aligned holes 43 and 44 for installation of a spark plug 42 are formed respectively in the cylinder head 3 and the cam cover 5. A connector 45 is inserted in the holes 43, 44 to electrically connect an ignition coil 46 disposed on the cam cover 5 with the spark plug 42 projecting in a combustion chamber C which forms part of the engine cylinder. The ignition coil 46 generates high tension secondary current upon causing primary current introduced through the connector 47 to flow and stop the current flow. The high tension secondary current is supplied to the spark plug 42 through a terminal 48, a conducive member 49 and a terminal 50.

Each upper branch runner 13 is integrally formed with a boss 51 located near the spark plug 46. The ignition coil 46 is fixedly provided with a stay 52 which is fixedly secured to the boss 51 of the branch runner 13 by two bolts 53 which pass through the stay 52 and screwed in the boss 51. A generally cylinderical protector 54 formed of rubber is disposed between the lower end section of the ignition coil 46 and the cam cover 5 at a part defining the hole 44. The side wall 12A of the intake air collectors 15, 16 is spaced from the ignition coil 46 to form a predetermined clearance therebetween as shown in FIG. 4. In FIG. 4, the reference numerals 55, 56 and 57 designate a bearing section formed in the cylinder head 3 to journal a camshaft (not shown), a lubricating oil passage, and an engine coolant jacket, respectively.

Each lower branch runner 31 (32) of the intake manifold lower block 11 is formed with a boss 46 to which a fuel injector valve 41 is attached. The fuel injector valve 41 has an injector holder 58 which is integrally formed with a fuel pipe 59. Since each upper branch runner 23 located immediately above the fuel injector 41 is connected to the upper intake air collector 16, the curvature on an imaginary vertical plane or in FIG. 2 can be enlarged thereby to increase a space above the fuel injector valve 41.

Figure 2:
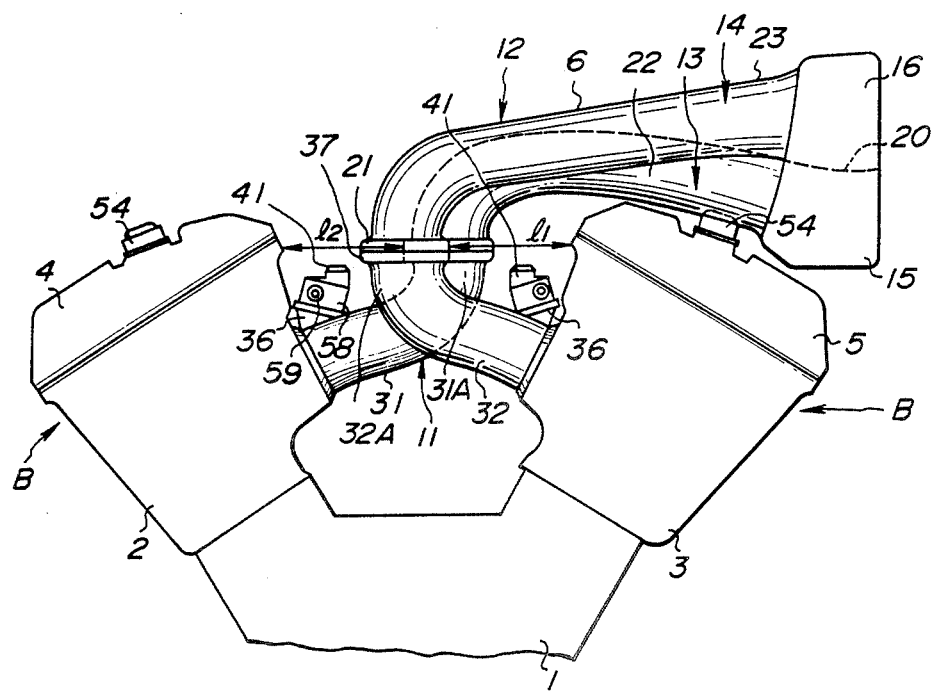
FIG. 2 is a fragmentary side elevation of the engine of FIG. 1.

Each lower branch runner 31 and each lower branch runner 32 cross each other, while the cross-sections of the adjacent lower branch runners 31, 32 are arranged such that the upper end section 31A of the lower branch runner 31 is located nearer the right side cylinder head 3 than the upper end section 32A of the lower branch runner 32 while the upper end section 32A is located nearer the left side cylinder head 2 than the upper end section 31A as seen from FIGS. 2 and 3. Accordingly, the distance $l_1$ between the lower branch runner upper end section 31A and the right side cylinder head 3 can be enlarged, and the distance $l_2$ between the lower branch runner upper end section 2A and the left side cylinder head 2 can be enlarged. This provides larger spaces around the fuel injector valves 41. As a result, freedom in setting the installation position and angle of the fuel injector valves 41 increases thereby optimizing matching among atomizing speed of injected fuel, mixing of the injected fuel with intake air and liquid fuel flow along intake system pipe inner wall. This improves engine performance. In addition, operational efficiency in installation of the fuel injector valves 41 is improved, thus raising productivity and maintenance efficiency of the engine.

With the thus arranged intake manifold 6, intake air sucked through an air filter (not shown) is introduced through the ducts 17, 18 into the respective lower and upper intake air collectors 15, 16 after passing through the throttle chamber. Intake air from the lower and upper intake air collectors 15, 16 are distributed through the intake air passages 13, 14 into the respective engine cylinders. Since the intake air collectors 15, 16 are disposed above one of the banks B, the whole height of the engine mainly decided according to the intake manifold 6 can be minimized while ensuring a sufficient length of each intake manifold branch runner thereby to improve charging efficiency of the engine.

The upper end sections 23A, 22A of the respective branch runners 23, 22 one upon another and located at the same position as projected on the imaginary horizontal plane, and therefore the sufficient clearance 24 for installation of the ignition device 50 is obtained between the adjacent branch runners 22, 22 (23, 23) in the cylinder head longitudinal direction. This enlarges freedom in installation of the ignition device, 50 while making possible to employ a direct ignition system in which the ignition coil 46 is disposed on the cam cover 5. In addition, operation for installation of the ignition coils 46, the spark plugs 42 and the like are considerably facilitated, thereby improving the productivity and the maintenance efficiency of the engine.

Such a special location of the upper branch runner upper end sections 22A, 23A makes unnecessary to be offset as projected on the imaginary horizontal plane. Accordingly, the length L (in FIG. 1) of the intake manifold 6 in the cylinder head longitudinal direction can be shortened thereby to make the intake manifold 6 small-sized. Equalization in length of the ducts 17, 18 makes equal the distance from a throttle valve (not shown) to the inlet of the intake air collector 15 and that from the throttle valve to the inlet of the intake air collector 16, thereby equalizing intake air passage conditions for the both left and right side banks B, B.

What is claimed is:

1. An intake manifold for a V-type multi-cylinder internal combustion engine including two banks each having a cylinder head, said intake manifold comprising:

first and second intake air collectors which are disposed above one of the two banks, each intake air collector being formed therein with an intake air chamber to be supplied with intake air;

a first group of branch runners for fluidly connecting said first intake air collector with the cylinder head of one of the two banks, each branch runner having a first end section directly connected to said first intake air collector and a second end section connected to the cylinder head;

a second group of branch runners for fluidly connecting said second intake air collector with the cylinder head of the other of the two banks, each branch runner having a first end section directly connected to said second intake air collector and second end section connected to the cylinder head; and means for generally vertically aligning the first end section of each of said first group of branch runners and the first end section of each of said second group of branch runners so as to form a clearance between the adjacent branch runners in longitudinal direction of the cylinder head.

2. An intake manifold as claimed in claim 1, wherein said second intake air collector is disposed on said first intake air collector.

3. An intake manifold as claimed in claim 2, wherein said first and second intake air collectors are formed integral.

4. An intake manifold as claimed in claim 1, wherein the first end section of each of said first group of branch runners is located below the first end section of said second group of branch runners.

5. An intake manifold as claimed in claim 1, wherein each of said first group of branch runners is formed generally S-shaped with first and second curved portions, and each of said second group of branch runners is formed generally S-shaped with first and second curved portions whose curvatures are respectively smaller than those of each of said first group of branch runners.

6. An intake manifold as claimed in claim 1, wherein each of said first and second group of branch runners includes a first counterpart having a first end portion connected to said intake air collector and a second end portion provided with first flange, and a second counterpart having a first end portion provided with a second flange and a second end portion connected with the cylinder head, said first and second flanges being in tight contact with each other.

7. An intake manifold as claimed in claim 6, wherein the second end portion of the first counterpart of each of said first group of branch runners is located nearer to one of the two banks than the second end portion of the first counterpart of each of said second group of branch runners.

8. An intake manifold as claimed in claim 6, wherein the second end portion of the first counterpart of each said first group of branch runners is located shifted in longitudinal direction of the cylinder head relative to the second end portion of the first counterpart of each of said second group of branch runners.

9. An intake manifold as claimed in claim 1, further comprising first and second ducts which are connected with said first and second intake air collectors at ends, respectively, intake air being supplied through said first and second ducts into said first and second intake air collectors.

10. An intake manifold as claimed in claim 9, wherein each of said first and second ducts is formed generally S-shaped.

11. An intake manifold as claimed in claim 1, wherein each branch runner is formed thereinside with an intake air passage through which the intake air chamber of said intake air collector is communicable with one of engine cylinders each of which is defined by the cylinder head.

12. An intake manifold as claimed in claim 1, further comprising means for controllably communicating said first and second intake air collectors in accordance with engine operating conditions.

* * * * *